(12) United States Patent
Kim et al.

(10) Patent No.: US 12,088,920 B2
(45) Date of Patent: Sep. 10, 2024

(54) IMAGE GENERATION METHOD USING TERMINAL CRADLE AND PORTABLE TERMINAL THEREFOR

(71) Applicant: 3I INC., Daegu (KR)

(72) Inventors: Ken Kim, Seoul (KR); Ji Wuck Jung, Goyang-si (KR)

(73) Assignee: 3I INC., Daegu (KR)

( * ) Notice: Subject to any disclaimer, the term of this patent is extended or adjusted under 35 U.S.C. 154(b) by 92 days.

(21) Appl. No.: 17/878,398

(22) Filed: Aug. 1, 2022

(65) Prior Publication Data
US 2023/0171502 A1 Jun. 1, 2023

Related U.S. Application Data

(63) Continuation of application No. PCT/KR2021/017709, filed on Nov. 29, 2021.

(51) Int. Cl.
*H04N 23/698* (2023.01)
*G06V 10/70* (2022.01)
*G06V 40/10* (2022.01)
*H04N 23/611* (2023.01)
*H04N 23/62* (2023.01)
(Continued)

(52) U.S. Cl.
CPC ......... *H04N 23/698* (2023.01); *H04N 23/611* (2023.01); *H04N 23/62* (2023.01); *H04N 23/661* (2023.01); *H04N 23/695* (2023.01); *G06V 10/70* (2022.01); *G06V 40/10* (2022.01)

(58) Field of Classification Search
CPC ........ G06V 10/70; G06V 20/52; G06V 40/10; G06V 40/103; H04N 23/611; H04N 23/62; H04N 23/661; H04N 23/695; H04N 23/698
See application file for complete search history.

(56) References Cited

U.S. PATENT DOCUMENTS

| | | | |
|---|---|---|---|
| 2020/0264695 A1* | 8/2020 | Sanjoto | ..................... G06F 3/00 |
| 2021/0208488 A1* | 7/2021 | Qian | ..................... F16M 13/00 |
| 2023/0262326 A1* | 8/2023 | Shi | ...................... H04N 23/695 |
| | | | 348/36 |

FOREIGN PATENT DOCUMENTS

| | | | |
|---|---|---|---|
| JP | 2010147691 A | * | 7/2010 |
| KR | 10-2005-0020521 A | | 3/2005 |

(Continued)

*Primary Examiner* — Mohammed S Rahaman
(74) *Attorney, Agent, or Firm* — NSIP Law

(57) ABSTRACT

Provided is a method performed in a portable terminal mounted on a rotatable terminal cradle to generate a 360° captured image by controlling operations of the terminal cradle. The 360° captured image is used generate a virtual space corresponding to a captured real space. Communication is established with the terminal cradle; an image generation input is received from a user; a first captured image is generated by imaging in an imaging direction that the terminal faces; driving commands are transmitted to the terminal cradle to rotate the imaging direction of the terminal clockwise or counterclockwise; a second captured image is generated by imaging in the changed imaging direction when the terminal cradle rotates according to the driving command; and presence of a human object is determined by recognizing objects in the first and second captured images, and re-imaging is performed in the imaging direction when a human object is present.

12 Claims, 13 Drawing Sheets

(51) Int. Cl.
*H04N 23/661* (2023.01)
*H04N 23/695* (2023.01)

(56) References Cited

FOREIGN PATENT DOCUMENTS

| | | |
|---|---|---|
| KR | 10-2021-0060792 A | 5/2021 |
| KR | 10-2300570 B1 | 9/2021 |
| WO | WO 2018/201493 A1 | 11/2018 |

\* cited by examiner

IMAGE GENERATION METHOD USING TERMINAL CRADLE AND PORTABLE TERMINAL THEREFOR

CROSS-REFERENCE TO RELATED APPLICATIONS

This application is a PCT Continuation By-Pass application of PCT Application No. PCT/KR2021/017709 filed on Nov. 29, 2021, in the Korean Intellectual Property Office, the entire disclosures of which are incorporated herein by reference for all purposes.

BACKGROUND

1. Field

The following description relates to an image generation method using a terminal cradle, and a portable terminal therefor.

2. Description of Related Art

With the development of computer graphics technology, various virtual reality-based technologies are being developed. Metaverse-related technologies that provide a virtual world corresponding to the real world are one example of these technologies.

In order to construct a virtual world corresponding to the real world, it is necessary to obtain captured images of the real world. It is possible to provide a virtual world corresponding to the real world by constructing a 360° image or a 3D model on the basis of captured images of the real world.

To this end, it is an important matter to obtain a 360° image of the real world. In the related art, a 360° image was obtained using specific dedicated imaging equipment having a plurality of wide-angle camera units installed to face different directions.

However, according to such related art, there is limitation that the dedicated equipment is expensive and is difficult to carry, and it is impossible to obtain a high-quality 360° image in an environment with the equipment.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

One aspect provides an image generation method using a terminal cradle. The image generation method using a terminal cradle is an image generation method that is performed in a portable terminal mounted on a rotatable terminal cradle to generate a 360° captured image by controlling the operation of the terminal cradle, the 360° captured image being used to generate a virtual space corresponding to a captured real space, the image generation method including: an operation of establishing communication with the terminal cradle; an operation of receiving an image generation input from a user; an operation of generating a first captured image by imaging in an imaging direction that the portable terminal faces; an operation of transmitting a driving command to the terminal cradle such that the imaging direction of the portable terminal rotates a preset angle clockwise or counterclockwise; an operation of generating a second captured image by imaging in the changed imaging direction when the terminal cradle finishes rotating according to the driving command; and an operation of determining whether a human object is present by recognizing objects in the first captured image and the second captured image, and performing re-imaging in the imaging direction when a human object is present.

Another aspect provides a computing device.

The computing device may include: a camera unit; a communication unit that establishes communication with a rotatable terminal cradle; a user interface unit that provides a user interface to a user and receives an image generation input from the user through the user interface; and a control unit that performs control to generate a plurality of captured images for configuring a 360° captured image by controlling the driving of the terminal cradle and the camera unit to generate a captured image when the image generation input is received, in which the control unit may determine whether a human object is present by recognizing objects in a generated captured image, and may perform setting such that the corresponding image is re-captured when a human object is present.

Still another aspect provides a computer-readable recording medium. The computer-readable recording medium is a computer-readable recording medium including a program for executing a control method of a portable terminal, in which the control method of a portable terminal may include: an operation of establishing communication with a terminal cradle; an operation of receiving an image generation input from a user; an operation of generating a first captured image by imaging in an imaging direction that the portable terminal faces; an operation of transmitting a driving command to the terminal cradle such that the imaging direction of the portable terminal rotates a preset angle clockwise or counterclockwise; an operation of generating a second captured image by imaging in the changed imaging direction when the terminal cradle finishes rotating according to the driving command; and an operation of determining whether a human object is present by recognizing objects in the first captured image and the second captured image, and performing re-imaging in the imaging direction when a human object is present.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
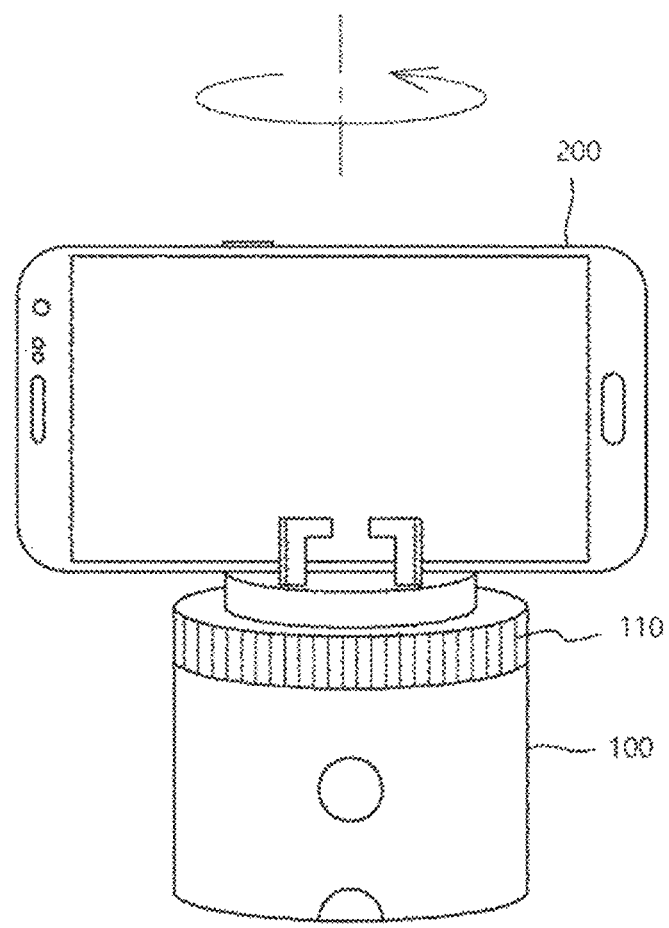
FIG. 1 illustrates a terminal cradle and a portable terminal that is linked with the terminal cradle, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

The user terminal 100, computing device 300, processor 301, and other devices, and other components described herein are implemented as, and by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-13, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

Although various flowcharts are disclosed to describe the embodiments of the present disclosure, this is for convenience of description of each step or operation, and each step is not necessarily performed according to the order of the flowchart. That is, each step in the flowchart may be performed simultaneously, performed in an order according to the flowchart, or may be performed in an order opposite to the order in the flowchart.

One or more examples may easily and accurately create 360° images by enabling a mobile terminal to control a terminal cradle.

One or more examples may prevent human objects from being present in captured images to increase the accuracy of constructing a virtual world.

FIG. 1 is a diagram showing a terminal cradle and a portable terminal that is linked with the terminal cradle according to an embodiment disclosed in the present invention.

Referring to FIG. 1, a terminal cradle 100 and a portable terminal 200 that is linked with the terminal cradle are shown.

The portable terminal 200 may be mounted on the terminal cradle 100 and the terminal cradle 100 is controlled to rotate by the portable terminal 200 and can rotate the mounting direction, that is, the imaging direction of the portable terminal 200.

Hereinafter, in one or more examples the terminal cradle 100 horizontally rotates and rotates the imaging direction of the portable terminal 200 in the horizontal direction (or in the left-right direction) based on the imaging direction, but this is for the convenience of description and the present invention is not limited thereto. For example, the terminal cradle 100 may tilt the mounted portable terminal 200 in the up-down direction or may both horizontally rotate (pan) and vertically rotate (tilt) the portable terminal 200.

The portable terminal 200 can perform imaging in the imaging direction. The portable terminal 200 can generate a 360° image in conjunction with the terminal cradle 100. For example, the portable terminal 200 may be mounted on the terminal cradle 100 and generate a 360° captured image of an imaging point by providing a driving command to the terminal cradle 100.

The generated 360° captured image is a 360° image of a real space and may be used to generate a virtual space corresponding to the space. For example, the 360° captured image may be used to provide a virtual 360° space corresponding to a real space on the basis of a 360° image at each point in the real space, or may be used to generate a 3D virtual space corresponding to a real space on the basis of 360° images (including a depth map image) captured at several points in a real space The portable terminal 200 is an electronic device that a user carries and is a computing device including a camera. For example, the portable terminal 200 may include a smart phone, a mobile phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, smart glasses and a head mounted display (HMD)), etc.

Figure 2:
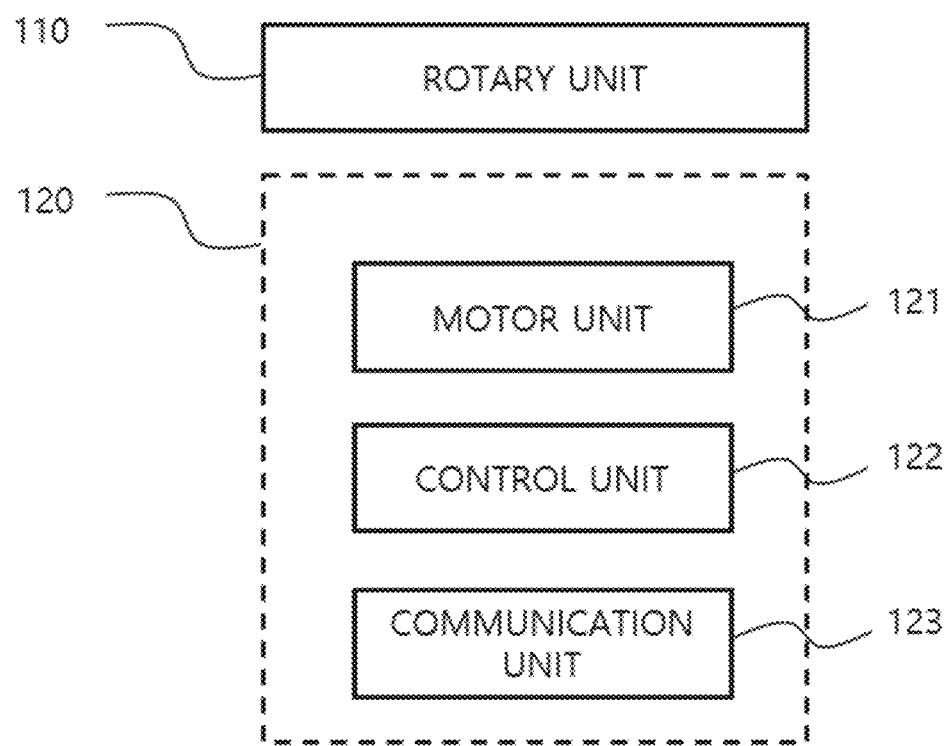
FIG. 2 is a block configuration diagram describing the terminal cradle, in accordance with one or more embodiments.

FIG. 2 is a block diagram describing the terminal cradle according to an embodiment. An embodiment of the terminal cradle 100 according to an embodiment is described with reference to FIGS. 1 and 2.

The terminal cradle 100 may include a rotary unit 110 and a main body unit 120.

The portable terminal 200 is mounted on the rotary unit 110 and may be rotated by operation of a motor unit 121. The imaging direction of the portable terminal 200 may be changed by rotation of the rotary unit 110. Further, the rotation direction and the rotation speed of the rotary unit 110 may be changed by driving of the motor unit 121.

For example, the rotary unit 110 may include a fixing table, a clamp, and a turntable. The fixing table and the clamp may be disposed on the turntable. The fixing table and the clamp may fix the portable terminal 200. A user can fix the portable terminal 200 without shaking by placing the portable terminal 200 between the fixing table and the clamp and then tightening the clamp. The turntable may be rotated by operation of the motor unit 121, and for this purpose, the turntable may be mechanically connected with the motor unit 121.

The main body unit 120 may include a motor unit 121, a control unit 122, and a communication unit 123. The control unit 122 can control operation of the terminal cradle 100 by controlling the components of the main body unit 120.

The communication unit 123 establishes a communication connection with the portable terminal 200 and may receive a control signal for driving the terminal cradle 100 from the portable terminal 200. For example, the communication unit 123 may establish a communication connection with the portable terminal 200 using at least one of a near-field communication module or wired communication.

The control unit 122 may control driving of the rotary unit 110 by driving the motor unit 121 in correspondence to a control signal received through the communication unit 123.

Hereinafter, a control signal that is transmitted from the portable terminal 200 to the terminal cradle 100 is referred to as a 'driving signal' and is a control signal related to driving, for example, horizontal rotation operation of the terminal cradle 100, but this is for the convenience of description, and the present invention is not limited thereto. That is, depending on embodiments, the control signal that is transmitted from the portable terminal 200 to the terminal cradle 100 may control power on/off, wireless link establishment requests, authentication, battery level display, etc. of the terminal cradle 100 other than controlling the rotational driving of the rotary unit 110 of the terminal cradle 100.

Figure 3:
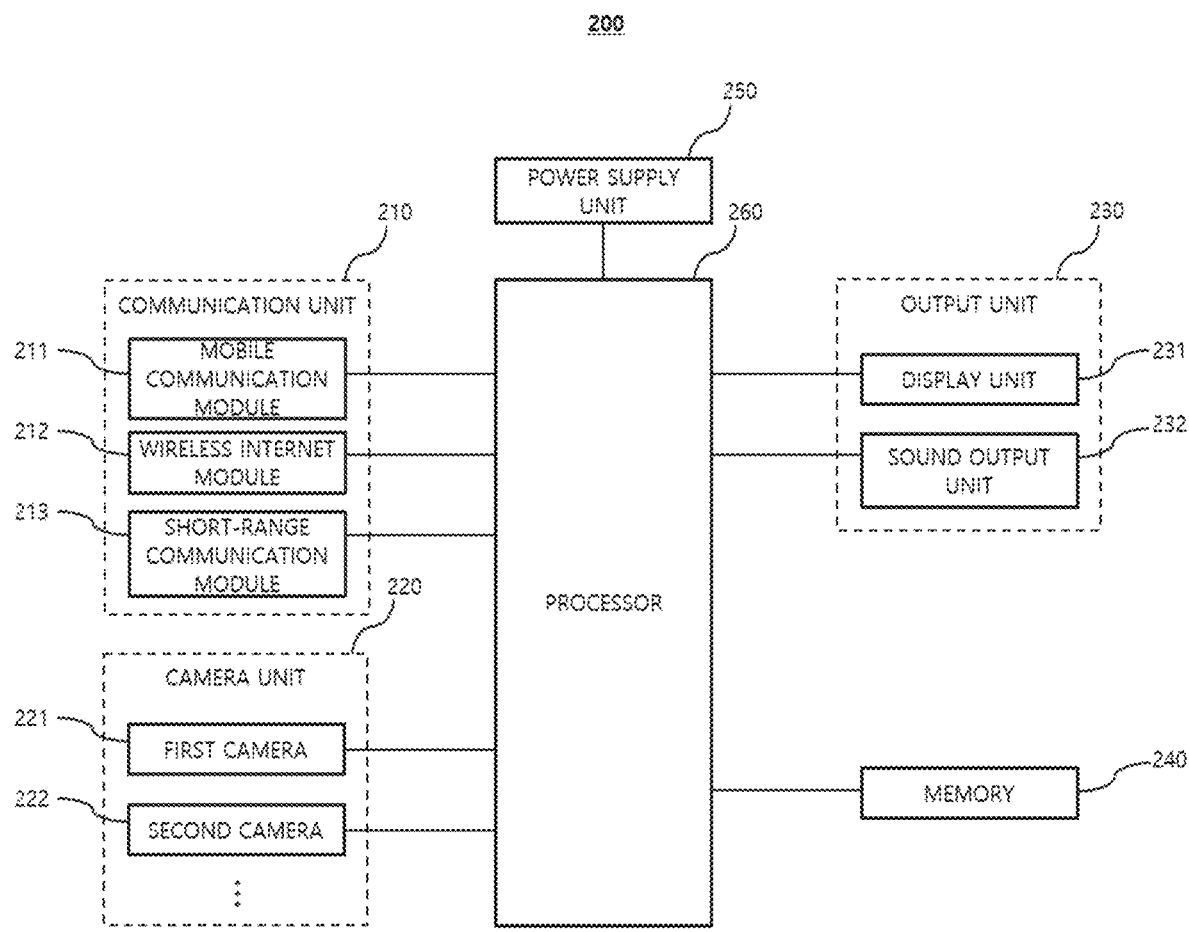
FIG. 3 is a block configuration diagram describing the portable terminal, in accordance with one or more embodiments.

FIG. 3 is a block diagram for describing the portable terminal according to an embodiment.

Referring to FIG. 3, the portable terminal 200 includes a communication unit 210, a camera unit 220, an output unit 230, a memory 240, a power supply unit 250, and a processor 260. The components shown in FIG. 3 are not necessary in implementing a portable terminal, so the portable terminal described in the present invention may include more or less components than the components described above.

The communication unit 210 may include one or more modules that enable communication between the portable terminal 200 and a communication system, between the portable terminal 200 and another portable terminal 200, or between the portable terminal 200 and the terminal cradle 100. The communication unit 210 may include a mobile communication module 211, a wireless Internet module 212, and a near-field communication module 213. The near-field communication module 213 may establish a communication connection with the terminal cradle 100 in a wired or wireless manner. For example, the near-field communication module 213 may include a near-field communication module such as Bluetooth, or a wired communication module such as RS232.

The camera unit 220 may include at least one camera unit. The camera unit 220 may include one or more lenses, image sensors, image signal processors, or flashes.

The camera unit 220 may include one or more cameras, for example, a first camera 221 and a second camera 222. The first camera 221 or the second camera 222 may capture an image in the imaging direction of the portable terminal 200, for example, in the front direction.

The output unit 230, which is for outputting output related to the sense of sight, the sense of hearing, or the sense of touch, may include a display unit 231 and a sound output unit 152. The display unit 231 forms a mutually layered structure with the touch sensor or is formed integrally with the touch sensor, thereby implementing a touch screen. Such a touch screen may provide an input interface or an output interface between the portable terminal 200 and a user.

The memory 240 may store programs (one or more instructions) for processing and controlling of the processor 260. The programs stored in the memory 240 may be separated into a plurality of modules in accordance with the functions of the stored programs. In accordance with an embodiment, a user interface, a control unit, and a matching unit to be described below with reference to FIGS. 4 and 5 may be stored as a software module in the memory 240.

The power supply unit 250 receives external power and internal power and supplies power to the components included in the portable terminal 200 under control of the processor 260. The power supply unit 250 includes a battery and the battery may be a built-in type battery or a replaceable type battery.

The processor 260 controls the overall operation of the portable terminal 200. The processor 260 is connected with the configuration of the portable terminal 200 including the communication unit 210 and memory 240 described above, and may control the overall operation of an terminal cradle 100 by executing at least one instruction stored in the memory 240 described above.

The processor 260 may be implemented in various ways. For example, the processor 260 may be implemented by at least one of a processor, an application specific integrated circuit (ASIC), an embedded processor, a microprocessor, a hardware control logic, a hardware finite state machine (FSM), and a digital signal processor (DSP). Meanwhile, in the one or more examples, the processor 260 may be used in a sense including a central processing unit (CPU), a graphic processing unit (GPU), a main processing unit (MPU), and the like.

The processor 260 generally controls the overall operation of the portable terminal 200 in addition to the operations related to application programs. The processor 260 processes signals, data, information, etc. that are input or output through the components described above, or runs the application programs stored in the memory 240, thereby providing or processing appropriate information or functions to a user.

The processor 260 may control at least some of the components described with reference to FIG. 3 to execute the application programs, that is, applications stored in the memory 240. Further, the processor 260, in order to run the application programs, may operate at least two or more of the components included in the portable terminal 200 in combination.

The processor 260 may run applications by executing instructions stored in the memory 240. Hereinafter, the processor 260 is expressed as a subject of performing control, instruction, or function by running applications, but the processor 260 may operate by executing instructions or applications stored in the memory 240. The components of FIGS. 4 and 5 to be described below may be functional or software modules that are implemented in the processor 260 in accordance with the instructions stored in the memory 240.

Meanwhile, the control method that is performed in the portable terminal 200 according to the embodiment described above may be implemented as a program and provided to the portable terminal 200. In particular, a program including the control method of the portable terminal 200 may be stored and provided in a non-transitory computer readable medium.

The control method of the terminal cradle 100 and a computer-readable recording medium including a program for performing the control method of the terminal cradle 100 have been briefly described above, but this is only for omitting repeated description, and it is apparent that various embodiments of the terminal cradle 100 may be applied to a computer-readable recording medium including the control method of the terminal cradle 100 and a program for performing the control method of the terminal cradle 100.

At least some of the components may operate in conjunction with each other to implement an operation, control, or a control method of the portable terminal according to various embodiments to be described below. Such operation, control, or control method of a portable terminal may be implemented on the portable terminal 200 by running of at least one application program stored in the memory 240.

Figure 4:
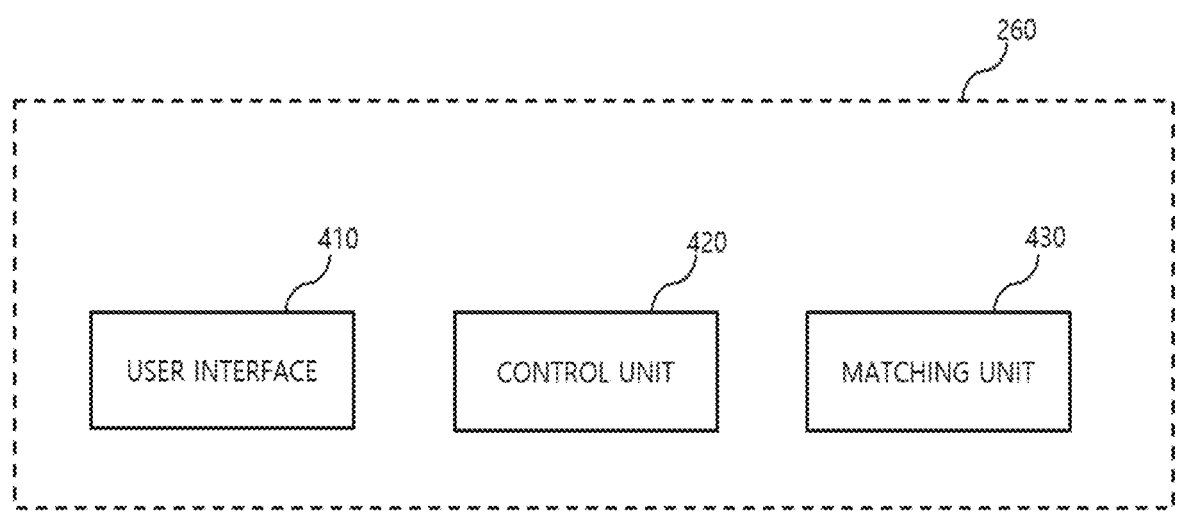
FIG. 4 is a block configuration diagram describing an embodiment of the processor shown in FIG. 3.

FIG. 4 is a block configuration diagram describing an embodiment of the processor shown in FIG. 3.

The processor 260 may include a user interface unit 410, a control unit 420, and a matching unit 430.

The user interface unit 410 may provide a user interface for capturing a 360° image to a user. For example, the user interface may be a user interface of a program for acquiring a 360° image and generating a virtual environment that provides a virtual environment using the 360° image.

When the user interface unit 410 receives an image generation input from a user through the user interface provided to the user, the user interface unit 410 may provide the image generation input to the control unit 420.

When the control unit 420 receives the image generation input from a user through the user interface unit 410, the control unit 420 may perform control to generate a plurality of captured images that are captured at different angles to generate a 360° image by controlling the driving of the terminal cradle 100 and the driving of the camera unit 220.

The control unit 420 may perform control to capture images at angles of 360° divided by N (N is a natural number of 2 or more) in order to generate a 360° image. For example, the control unit 420 may control driving (45° rotation driving) of the terminal cradle 100 and driving (capturing a front image after rotation) of the camera unit 220 such that imaging is performed every 45°.

In this case, a natural number N of 2 or more that determines the division of N may be determined in correspondence to the angle of view of a portable terminal. For example, the control unit 420 may check information about the angle of view of the camera unit 220, and may set a rotation angle such that adjacent captured images at least partially overlap at sides on the basis of the checked angle of view of the camera unit 220. That is, the control unit 420 may set a preset predetermined angle such that a first side of a first captured image and a second side of a second captured image overlap in at least a partial region.

Figure 7:
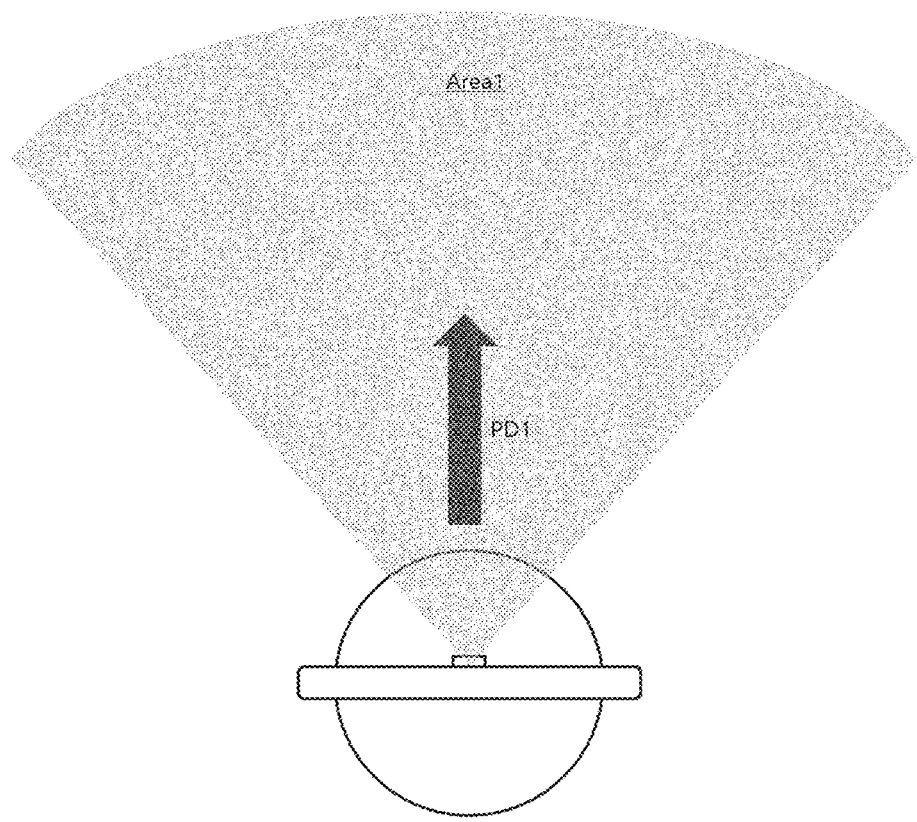
FIGS. 7 and 8 are diagrams describing examples of the image generation method using a terminal cradle.
Figure 8:
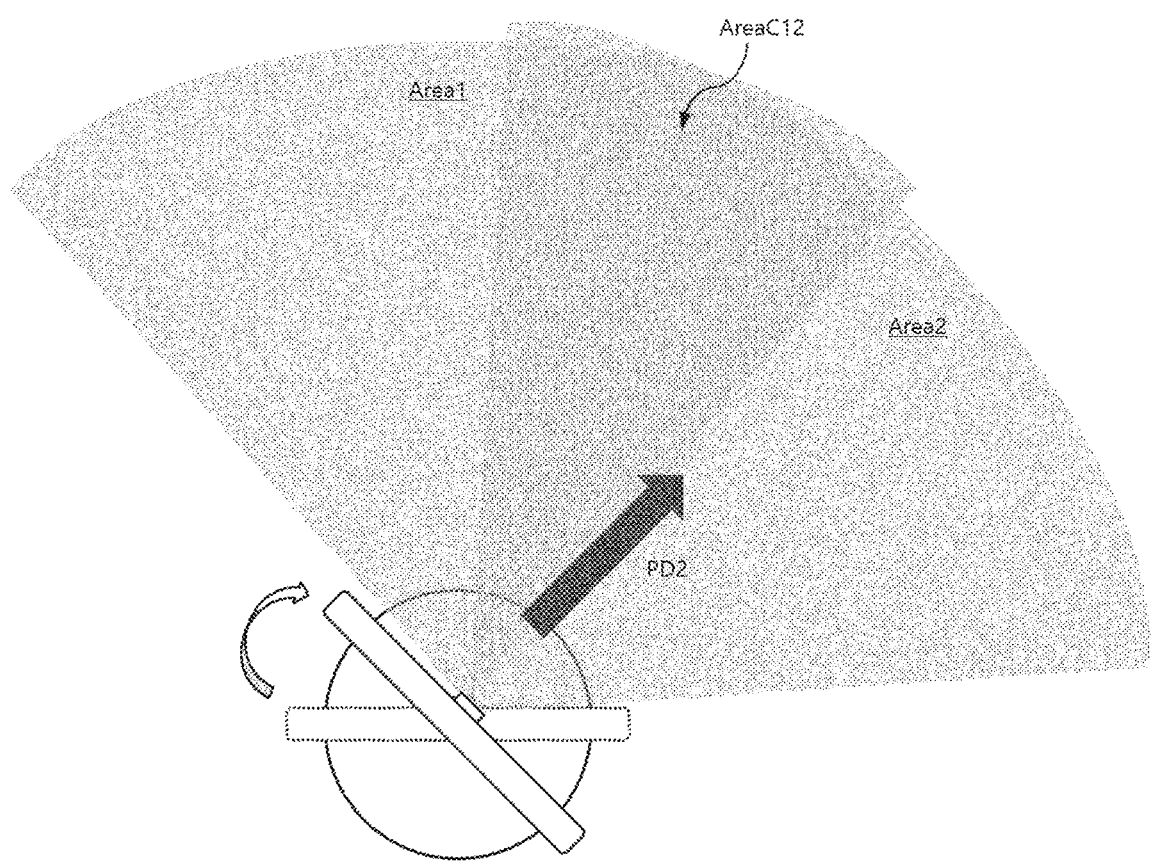

FIG. 7 shows an imaging area Area1 by an angle of view in a first imaging direction PD1 and FIG. 8 shows a second imaging direction PD2 after rotating 45° clockwise in FIG. 7 and an imaging area Area2 in the direction. In FIG. 8, it can be seen that rotation is made such that the imaging area of the first imaging direction and the imaging area of the second imaging direction have a common area AreaC12 in which they overlap in at least a partial region, that is, at the right side of the first captured image and the left side of the second captured image when seen in captured images.

The control unit 420 may determine whether a human object is present by recognizing images in a generated captured image, and may perform setting such that the corresponding image is re-captured when a human object is present.

Figure 12A:
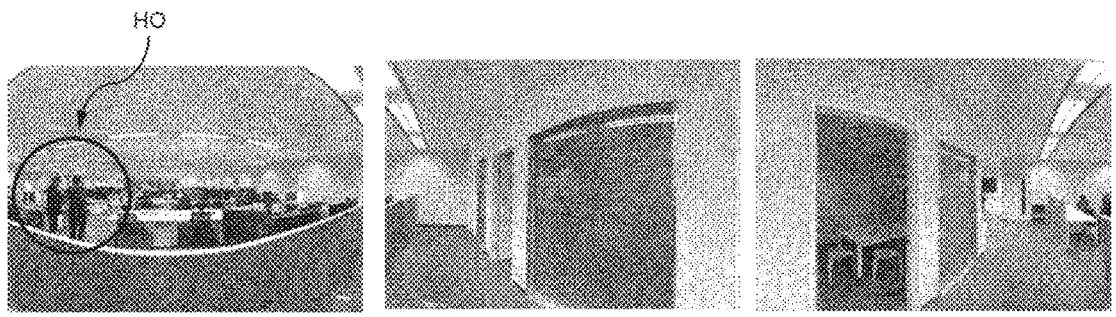
FIG. 12A, FIG. 12B, and FIG. 13 are diagrams showing examples of re-captured images according to a re-imaging process and a 360° image matched on the basis of the images.
Figure 12B:
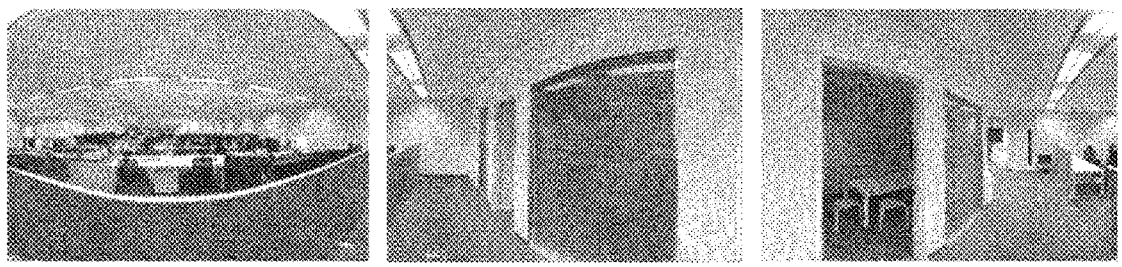

FIG. 12 shows such an example, and FIG. 12A shows captured images before re-imaging occurs. In FIG. 12A, a human object HO is present in the first image and the control unit 420 may perform re-imaging for the first image. FIG. 12B exemplifies an image captured through such re-imaging, and it can be seen that the human object was removed.

Figure 13:
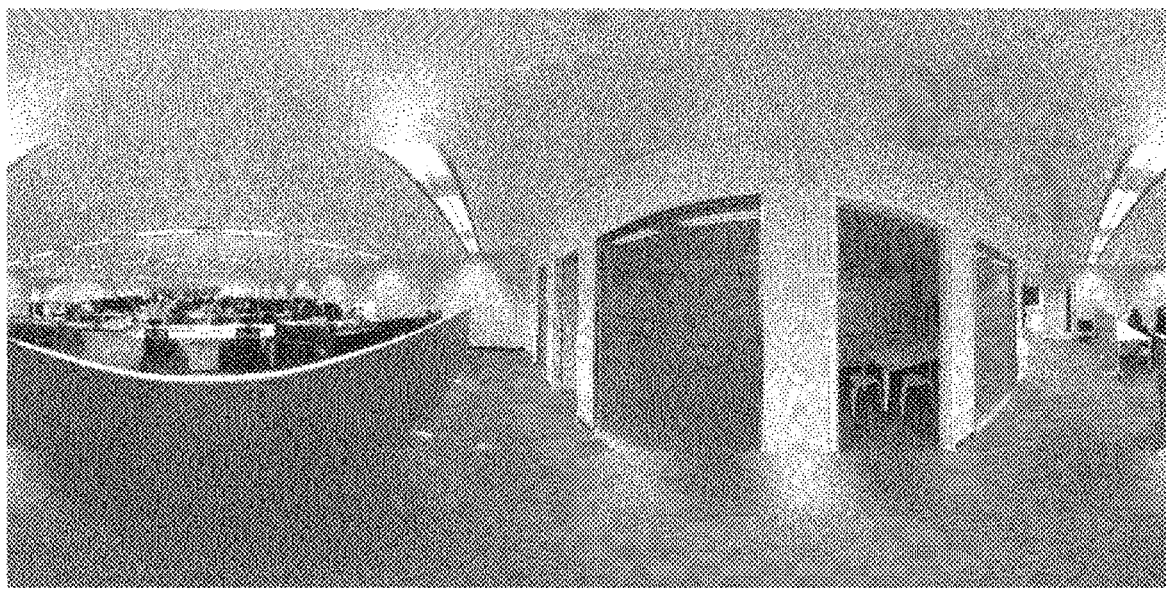

When a plurality of captured images for generating a 360° image are generated according to the control of the control unit 420, the matching unit 430 receives the plurality of captured images and matches the captured images, thereby generating a 360° image. FIG. 13 exemplifies a 360° image in which the images of FIG. 12B are matched.

For example, the matching unit 430 may extract feature points from two adjacent captured images of the plurality of captured images, and stitch the images on the basis of the feature points. For example, the matching unit 430 may extract feature points using a difference of Gaussian (DOG) of scale invariant feature transform (SIFT), Haar wavelet and smallest Uni-Value segment assimilating nucleus test (SUSAN) of speeded up robust feature (SURF) technique, or a features from accelerated segment test (FAST) technique, and may match images by matching feature points on the basis of the extracted feature points.

Figure 5:
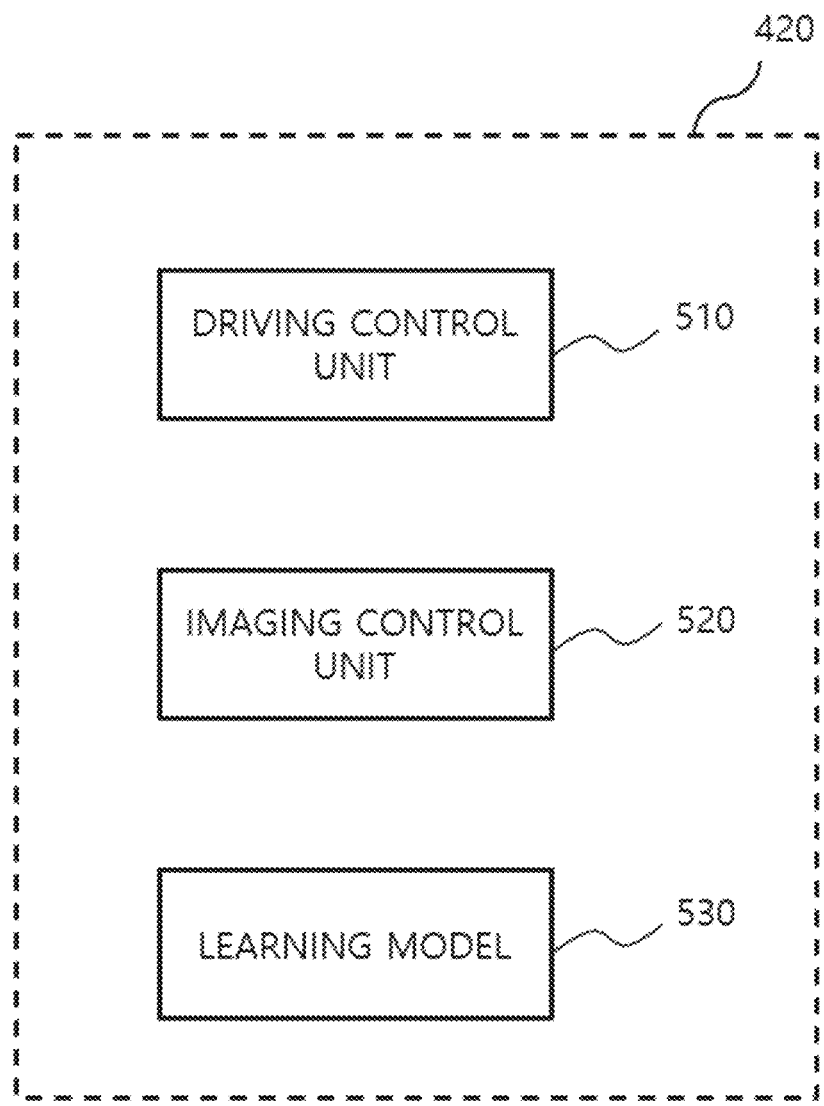
FIG. 5 is a block configuration diagram describing an embodiment of the control unit shown in FIG. 4.

FIG. 5 is a block configuration diagram for describing an embodiment of the control unit shown in FIG. 4, and an embodiment of the control unit is described with reference to FIG. 5.

In an embodiment shown in FIG. 5, the control unit 420 may include a driving control unit 510, an imaging control unit 520, and a learning model 530.

The driving control unit 510 may control driving of the terminal cradle 100 by providing a driving command to the terminal cradle 100 on the basis of a communication line with the terminal cradle 100 connected through the communication unit 210.

For example, the driving control unit 510 may control driving of the terminal cradle 100 according to the control of the imaging control unit 520. For example, when the imaging control unit 520 determines to rotate an imaging direction, the imaging control unit may provide rotation request information to the driving control unit 510. The driving control unit 510 may generate and provide a driving command to the terminal cradle 100 on the basis of the provided rotation request information.

The imaging control unit 520 may control other components to generate a 360° image. The imaging control unit 520 may control the camera unit to generate a captured image of a front image.

The imaging control unit 520 may determine to change the imaging direction of the camera on the basis of the imaging of the front image and can provide corresponding rotation request information to the driving control unit 510.

When the imaging direction is changed, the imaging control unit 520 may control the camera unit to generate a captured image for the changed imaging direction. For example, it may be determined whether an imaging direction is changing or finishes changing on the basis of whether a captured image changes. When a captured image changes and then there are no further changes, the imaging control unit 520 determines that changing of the imaging direction is completed, and may perform control to generate a captured image in the changed imaging direction.

The imaging control unit 520 may perform control to generate a plurality of images in correspondence to the N-division described above to generate a 360° image by repeating the imaging and rotating described above. When the generation of a plurality of captured images for generating a 360° image is completed, the imaging control unit 520 may provide the images to the matching unit 430.

The learning model 530 is an object extraction model that can extract a human object from an input image by performing machine learning on a plurality of learning images including a human object. For example, the learning model 530 may extract objects from a captured image on the basis of machine learning and identify human objects among the extracted objects.

When the learning model 530 recognizes a human object in a captured image, the learning model 530 may inform the imaging control unit 520 of this fact. When a human object is recognized in a captured image in a specific imaging direction, the imaging control unit 520 may set re-imaging for the imaging direction. This is for fundamentally solving a problem that, when a 3D model of a virtual space corresponding to a real space is generated on the basis of a 360° image generated at a several points, a human object itself becomes noise data by the characteristic that the human object moves. That is, when a human object is recognized in a 3D modeling process and the human object is removed, a large hole corresponding to the size of the human body is generated, and accordingly, inaccuracy of a 3D model for the region where the hole is generated occurs. In addition, many computing resources are required in the process of recognizing a human object and filling a hole in such a 3D modeling process. Accordingly, in the present application, when a 360° image is formed, the presence of a human object is recognized in advance and re-imaging is performed in the imaging direction in which a human object is recognized such the human object is not recognized, so it is possible to contribute to generating a simpler and more precise 3D model using less resources.

Hereinafter, various embodiments that are performed in the portable terminal 100 and generate a 360° image such that a human object is not present are described with reference to FIGS. 6 to 11.

Figure 6:
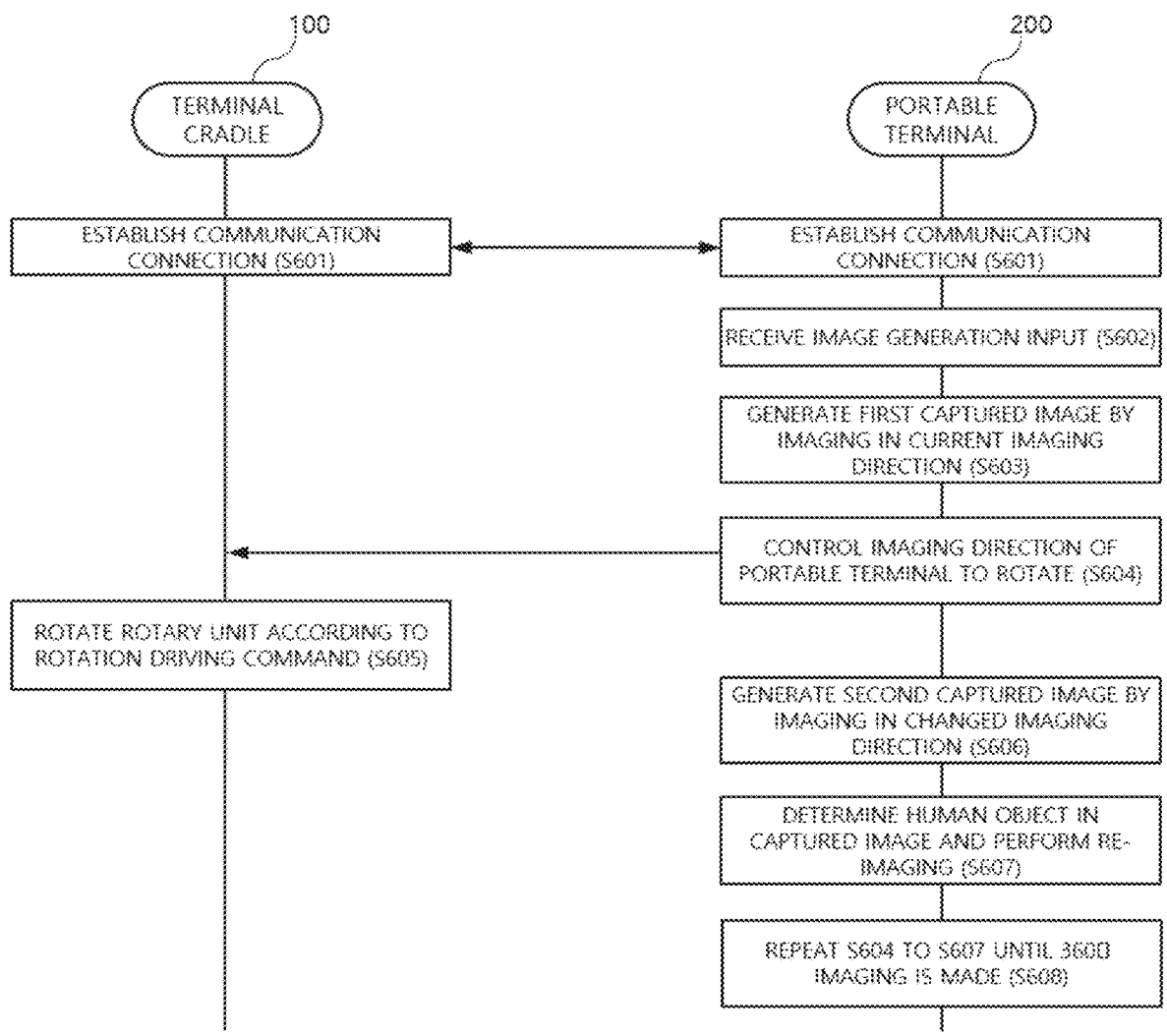
FIG. 6 is a flowchart describing an image generation method using a terminal cradle, in accordance with one or more embodiments.

FIG. 6 is a flowchart describing an image generation method using a terminal cradle according to an embodiment.

Referring to FIG. 6, the control unit 420 may establish a communication connection with the terminal cradle 100 by controlling the communication unit (S601). For example, the communication unit and the terminal cradle 100 may include a Bluetooth communication module and the control unit 420 may establish a communication connection with the terminal cradle 100 through Bluetooth communication.

When the control unit 420 receives an image generation input from a user (S602), the control unit 420 may generate a first captured image by imaging in the current imaging direction, that is, the imaging direction that the portable terminal 100 faces (S603).

The control unit 420 may transmit a driving command to the terminal cradle 100 such that the imaging direction of the portable terminal 100, that is, the front direction, rotates a preset angle clockwise or counterclockwise (S604).

The terminal cradle 100 may rotate the front of the portable terminal a preset angle clockwise or counterclockwise in accordance with the received driving command (S605).

When the terminal cradle 100 finishes rotating according to the driving command, the control unit 420 may generate a second captured image by imaging in the changed imaging direction (S606).

When the control unit 420 generates a captured image, the control unit 420 may generate direction information about the imaging direction in which the captured image is generated, and store the direction information in association with the captured image. For example, the control unit 420 may generate rotation angle information for a captured image as direction information, and in this exemplary case, the control unit 420 may generate 45° clockwise rotation as direction information for the example of FIG. 8 and store the direction information in association with the second captured image. The direction information association with each captured image may be used to reset a direction in a re-imaging process.

The control unit 420 determines whether a human object is present by recognizing objects in the first captured image and the second captured image, and can perform re-imaging in the imaging direction when a human object is present (S607). For this purpose, the control unit 420 may include an object extraction model that can extract a human object from an input image by performing machine learning on a plurality of learning images including a human object, that is, the learning model 530.

The control unit 420 may repeatedly perform imaging direction rotation (S604), imaging (S606), and determining a human object and re-imaging (S607) such that 360° imaging is completed (S608). Through the re-imaging process, a 360° image in which a human is not displayed can be generated.

When a plurality of captured images for 360° imaging without a human object are acquired, the control unit 420 may provide the plurality of captured images to the matching unit 430 such that the images are matched in a 360° image.

Figure 9:
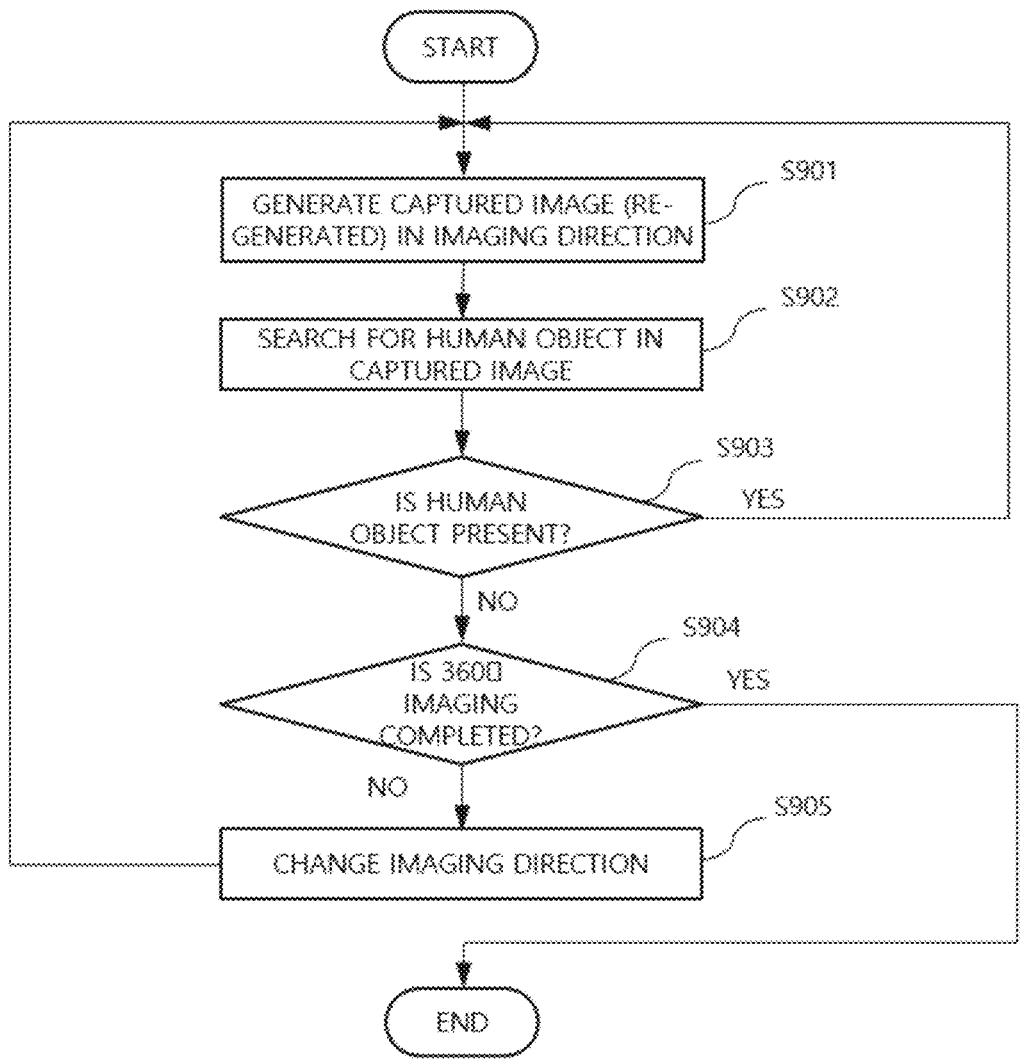
FIG. 9 is a flowchart describing an example of a re-imaging process, in accordance with one or more embodiments.

FIG. 9 is a flowchart for describing an example of a re-imaging process according to an embodiment. The embodiment shown in FIG. 9 relates to an embodiment in which it is determined whether a human object is present in each imaging direction and then the imaging direction is changed when it is determined that a human object is present.

Referring to FIG. 9, the control unit 420 may generate a captured image in the current imaging direction (S901), and when a captured image is generated, the control unit 420 may determine whether a human object is present in the generated captured image after inputting the generated captured image into the object extraction model (S902).

When a human object is present (S903, Yes), the control unit 420 sets the captured image to a re-imaging target image and performs captured image re-generation (S901).

When a human object is not present (S903, No), it is determined whether 360° imaging is completed by the current imaging (S904).

When 360° imaging is not completed (S904, No), control is performed to change the imaging direction by a preset angle (S905), and the processes of imaging and verifying a human object (S901 to S903) are repeated.

When 360° imaging is completed (S904, Yes), a plurality of captured images to the matching unit 430 are provided such that a 360° image is generated.

In the embodiment shown in FIG. 9, an imaging direction is changed after checking for the presence of a human object in every imaging direction, and thus it is advantageous in terms of minimizing the rotation of the terminal cradle 100. For example, the portable terminal 100 may check remaining amount information of the battery of the terminal cradle 100, and may generate a 360° image using the embodiment of FIG. 9 when the remaining amount of the battery of the terminal cradle 100 is a predetermined level or less.

Figure 10:
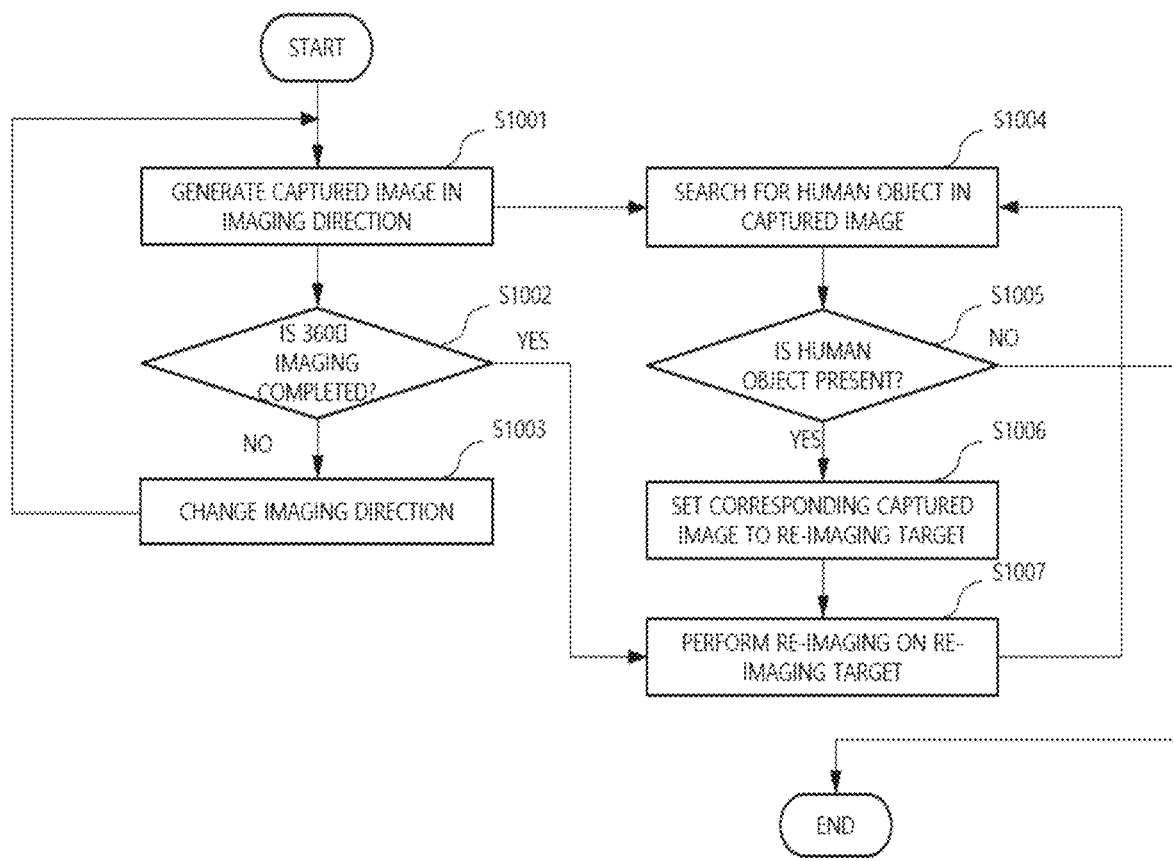
FIG. 10 is a flowchart describing another example of the re-imaging process, in accordance with one or more embodiments.

FIG. 10 is a flowchart for describing another example of the re-imaging process according to an embodiment. The embodiment shown in FIG. 10 relates to an embodiment in which it is determined whether a human object is present in a pre-generated captured image while performing 360° imaging, and then re-imaging is performed in the direction in which a human object is present.

Referring to FIG. 10, the control unit 420 may generate a captured image in the current imaging direction (S1001).

Thereafter, the control unit 420 may simultaneously perform a process of searching for a human object in a captured image (S1004) and processes of performing 360° imaging (S1002 to S1003) in parallel.

That is, the control unit 420 may check whether 360° imaging is completed when a captured image is generated (S1004), and may repeatedly perform imaging (S1001) while changing the imaging direction (S1003) when it is not completed.

Further, the control unit 420 may determine whether a human object is present in a generated captured image after inputting the generated captured image into the object extraction model when a captured image is generated (S1004), and may set the captured image to a re-imaging target (S1006) when a human object is present (S1005, Yes).

The control unit 420 sets the captured image to a re-imaging target image and performs captured image re-generation (S901). As in the example described above, a re-imaging target image may be stored in association with re-imaging direction information.

When 360° imaging is completed and there is a re-imaging target, the control unit 420 can perform re-imaging in the re-imaging direction (S1007).

In an embodiment, the control unit 420 may check direction image related to the re-imaging target image and may set any one re-imaging target image that is close to the current direction, that is, has a small rotation angle. The control unit 420 may transmit a re-imaging driving command to the terminal cradle 100 to change the imaging direction of the portable terminal to a selected re-imaging direction. When the terminal cradle 100 finishes rotating according to the re-imaging driving command, the control unit 420 may generate a re-imaging image by performing imaging in the changed imaging direction—that is, the selected re-imaging direction. When a human object is not present in the generated re-imaging image, the control unit may replace the re-imaging target image with the re-imaging image. The control unit 420 may perform re-imaging by performing this process on all re-imaging target images.

As described above, in the embodiment shown in FIG. 10, it is possible to perform 360° imaging by driving the terminal cradle 100 and simultaneously searching for an object and setting re-imaging for a previously captured image. Accordingly, object detection and re-imaging setting, and 360° imaging are simultaneously performed, and thereby the overall imaging time is efficiently set. That is, object detection and determination of whether to perform re-imaging should be performed first in order to rotate to the next direction in the embodiment of FIG. 9, but, in the embodiment of FIG. 10, these processes are simultaneously performed, and thus the overall imaging procedure can be quickly performed.

Figure 11:
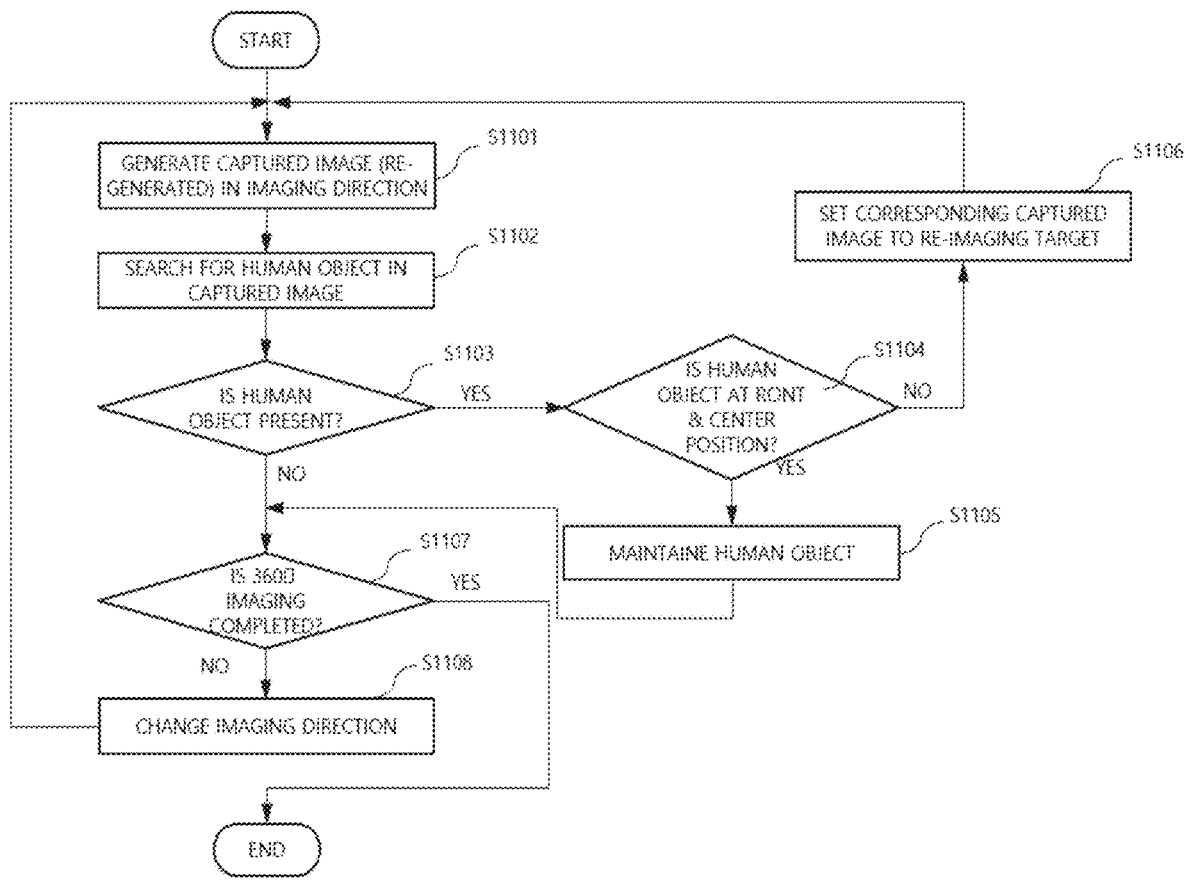
FIG. 11 is a flowchart describing still another example of the re-imaging process, in accordance with one or more embodiments.

In an embodiment, when a human object satisfying a predetermined condition is present, the control unit 420 may allow the human object to be present in a captured image. This is for determining a case in which a human object present in a 360° image was intentionally captured, and for not deleting a human object in this case. FIG. 11 is a flowchart for describing still another example of a re-imaging process according to an embodiment disclosed in the present invention, and such an embodiment is described with reference to FIG. 11.

Referring to FIG. 11, the control unit 420 may generate a captured image in an imaging direction (S1101), and when a captured image is generated, the control unit 420 may determine whether a human object is present in the captured image using an object extraction model (S1002).

When a human object is present (S1103, Yes), it may be determined whether the human object satisfies a non-deletion condition (S1104).

For example, the non-deletion condition may be that a human body faces the front and is positioned at the center in a captured image. For example, the object extraction model may determine whether a human object faces the front by recognizing the face of the human object, and provide it to the control unit 420. When a human object faces the front and is positioned at the center in a captured image, the control unit 420 determines that the human object is an object satisfying the non-deletion condition, and maintains the human object (S1105), and may process it like a captured image without a human object. When a human object does not satisfy the non-deletion condition, the captured image is an image in which a human object is present and may be set to a re-imaging image (S1106).

In this case, the center or the sides described above may be determined in accordance with settings, and for example, a center 50% based on a vertical center line of a captured image may be set to a center and 25% at both sides of the center may be set to sides.

Thereafter, 360° imaging (S1107 and S1108) is performed and re-imaging of a re-imaging image is performed (S1106), which can be understood with reference to the above description referring to FIGS. 9 and 10.

In such an embodiment, it is possible to intentionally allow a human object to remain in a 360° image of a virtual space.

Functions related to the learning model according to the present invention is operated through the processor 260 and the memory 240. The learning module is characterized by being made through learning. In this case, made through learning means that a pre-defined operation rule or learning model that is set to perform a desired characteristic (or object) is made because a fundamental learning model learns using a plurality of pieces of learning data by a learning algorithm. Such learning may be made in a device itself in which artificial intelligence according to the present invention is performed, or may be made through a specific server and/or system. The learning algorithm, for example, may be supervised learning, unsupervised learning, semi-supervised learning, or reinforcement learning, but is not limited to the examples described above.

The learning model may be composed of a plurality of neural network layers. The plurality of neural network layers each have a plurality of weight values, and can perform learning model calculation through calculation between a calculation result and the plurality of weight values of a previous layer. The plurality of weight values of the plurality of neural network layers may be optimized by a learning result of the learning model. For example, the plurality of weight values may be updated such that a loss value or a cost value obtained in the learning model during a learning process is reduced or minimized. The learning model may include a deep neural network (DNN), and for example, may include a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-Network, but the present invention is not limited thereto.

In one or more examples, there is an effect that it is possible to easily and accurately generate a 360° image using a terminal cradle for mounting a portable terminal.

In one or more examples, it is possible to prevent a human object from being present in a captured image by re-imaging when there is a human object in the captured image. Accordingly, there is an effect that it is possible to remove unnecessary noise in advance from an image constructing a virtual world and to construct a more accurate virtual world.

In one or more examples, since a re-imaging target is determined together with sequential imaging for 360°, there is an effect that it is possible to efficiently reduce the time and procedure required for imaging.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image generation method implementing a terminal cradle that is performed in a portable terminal mounted on a rotatably driven terminal cradle to generate a 360° captured image by controlling operation of the terminal cradle, the 360° captured image being implemented to generate a virtual space corresponding to a captured real space, the image generation method comprising:
    an operation of establishing communication with the terminal cradle;
    an operation of receiving an image generation input from a user;
    an operation of generating a first captured image by imaging in an imaging direction that the portable terminal faces;
    an operation of transmitting a driving command to the terminal cradle such that the imaging direction of the portable terminal rotates a preset angle clockwise or counterclockwise;
    an operation of generating a second captured image by imaging in the rotated imaging direction when the terminal cradle finishes rotating according to the driving command;
    an operation of determining whether a human object is present by recognizing objects in at least one of the first captured image and the second captured image;
    an operation of determining whether the human object present in at least one of the first captured image and the second captured image, satisfies a non-deletion condition;
    an operation of processing at least one of the first captured image and the second captured image where the human object is present as at least a captured image without the human object if the human object satisfies the non-deletion condition; and
    an operation of setting to perform re-imaging if the human object does not satisfy the non-deletion condition and performing re-imaging in at least one of the imaging direction and the rotated imaging direction,
    wherein the non-deletion condition includes a direction in which the human object faces and a location in which the human object is positioned in the captured image.

2. The image generation method of claim 1, further comprising generating a 360° captured image by matching a plurality of captured images generated by repeating the operation of transmitting a driving command and the operation of performing re-imaging.

3. The image generation method of claim 1, wherein the preset angle is determined by dividing 360° by N (N is a natural number of 2 or more), and the N is determined in correspondence to an angle of view of the portable terminal.

4. The image generation method of claim 1, wherein a predetermined angle is set such that a first side of the first captured image and a second side of the second captured image overlap at least in a partial area.

5. The image generation method of claim 1, wherein the first captured image and the second captured image are stored in association with direction information about an imaging direction in which a captured image is generated.

6. The image generation method of claim 5, wherein the operation of performing re-imaging includes:
    an operation of providing an object extraction model that allows a human object to extract from an input image by performing machine learning on a plurality of learning images including a human object;
an operation of determining whether a human object is present in a generated captured image after inputting the generated captured image into the object extraction model when a captured image is generated; and
setting a corresponding captured image to a re-imaging target image and setting a direction of a corresponding re-imaging target image to a re-imaging direction when a human object is present.

7. The image generation method of claim 6, wherein the operation of performing re-imaging includes:
an operation of transmitting a re-imaging driving command to the terminal cradle to change an imaging direction of the portable terminal to the re-imaging direction;
an operation of generating a re-imaging image by imaging in the changed imaging direction when the terminal cradle finishes rotating according to the driving command; and
an operation of replacing the re-imaging target image with the re-imaging image.

8. A portable terminal comprising:
a camera;
a communicator that establishes communication with a rotatable terminal cradle;
and
a controller configured to perform control to generate a plurality of captured images for configuring a 360° captured image by controlling driving of the terminal cradle and the camera unit to generate a captured image when an image generation input is received through a user interface,
wherein the controller is configured to determine whether a human object is present by recognizing objects in a captured image, and performs setting to perform re-imaging on a corresponding image when a human object is present,
wherein the controller is further configured to:
determine whether the human object satisfies a non-deletion condition when the human object is present in the captured image,
process the captured image where the human object is present as a captured image without the human object if the human object satisfies the non-deletion condition, and
set to perform re-imaging an image if the human object does not satisfy the non-deletion condition,
wherein the non-deletion condition includes a direction in which the human object faces and a location in which the human object is positioned in the captured image.

9. The portable terminal of claim 8, wherein the controller:
controls the camera unit to generate a first captured image in a current imaging direction that the portable terminal faces when the image generation input is received;
transmits a driving command to the terminal cradle such that the imaging direction of the camera rotates a preset angle clockwise or counterclockwise;
controls the camera unit to generate a second captured image by imaging in the changed imaging direction when the terminal cradle finishes rotating according to the driving command; and
determines whether a human object is present by recognizing objects in the first captured image and the second captured image, and performs re-imaging in the imaging direction when a human object is present.

10. The portable terminal of claim 9, wherein the controller:
provides an object extraction model that allows a human object to extract from an input image by performing machine learning on a plurality of learning images including a human object;
determines whether a human object is present in a generated captured image after inputting the generated captured image into the object extraction model when a captured image is generated; and
sets a corresponding captured image to a re-imaging target image and sets a direction of a corresponding re-imaging target image to a re-imaging direction when a human object is present.

11. The portable terminal of claim 10, wherein the controller:
transmits a re-imaging driving command to the terminal cradle to change an imaging direction of the portable terminal to the re-imaging direction;
generates a re-imaging image by controlling the camera to image in the changed imaging direction when the terminal cradle finishes rotating according to the driving command; and
replaces the re-imaging target image with the re-imaging image.

12. A non-transitory computer-readable recording medium including a program for executing a control method of a portable terminal,
wherein the control method of a portable terminal includes:
an operation of establishing communication with a terminal cradle;
an operation of receiving an image generation input from a user;
an operation of generating a first captured image by imaging in an imaging direction that the portable terminal faces;
an operation of transmitting a driving command to the terminal cradle such that the imaging direction of the portable terminal rotates a preset angle clockwise or counterclockwise;
an operation of generating a second captured image by imaging in the changed imaging direction when the terminal cradle finishes rotating according to the driving command;
an operation of determining whether a human object is present by recognizing objects in the first captured image and the second captured image;
an operation of determining whether the human object present in at least one of the first captured image and the second captured image, satisfies a non-deletion condition;
an operation of processing at least one of the first captured image and the second captured image where the human object is present as at least a captured image without the human object if the human object satisfies the non-deletion condition; and
an operation of setting to perform re-imaging if the human object does not satisfy the non-deletion condition and performing re-imaging in at least one of the imaging direction and the rotated imaging direction,
wherein the non-deletion condition includes a direction in which the human object faces and a location in which the human object is positioned in the captured image.

* * * * *